J. K. WEDGWORTH.
ADJUSTABLE CULTIVATOR.
APPLICATION FILED FEB. 5, 1912.
1,039,856.
Patented Oct. 1, 1912.
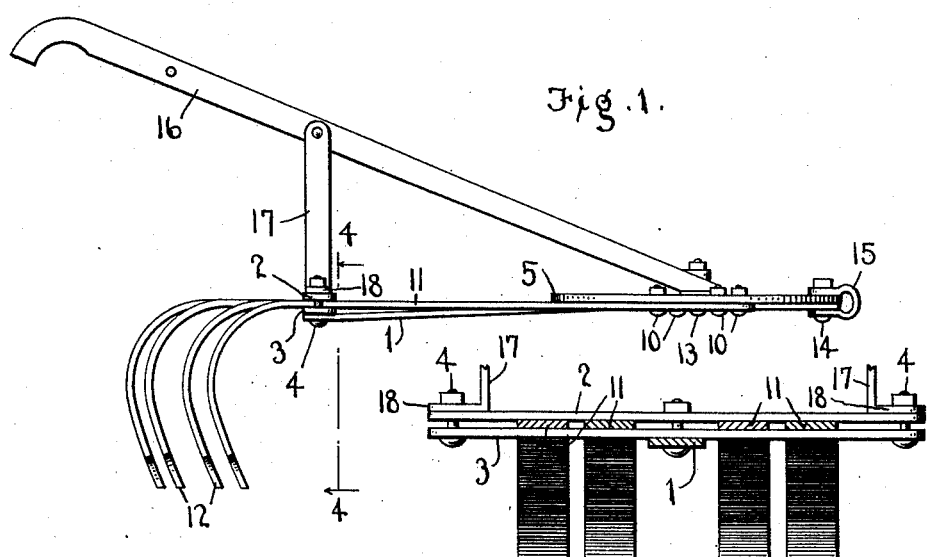
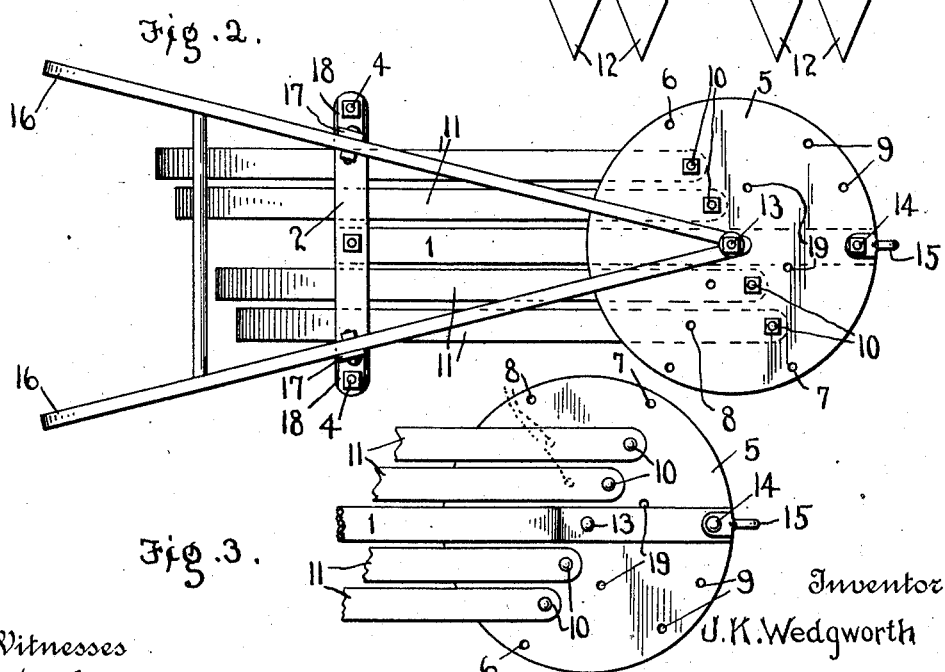
Witnesses
L. B. James
C. E. Hunt
Inventor
J. K. Wedgworth
by H. B. Willson & Co.
Attorneys
COLUMBIA PLANOGRAPH CO., WASHINGTON, D. C.

UNITED STATES PATENT OFFICE.

JOHN K. WEDGWORTH, OF CUBA, ALABAMA.

ADJUSTABLE CULTIVATOR.

1,039,856. Specification of Letters Patent. Patented Oct. 1, 1912.

Application filed February 5, 1912. Serial No. 675,592.

*To all whom it may concern:*

Be it known that I, JOHN K. WEDGWORTH, a citizen of the United States, residing at Cuba, in the county of Sumter and State of Alabama, have invented certain new and useful Improvements in Adjustable Cultivators; and I do declare the following to be a full, clear, and exact description of the invention, such as will enable others skilled in the art to which it appertains to make and use the same.

This invention relates to improvements in adjustable cultivators.

One object of the invention is to provide a cultivator having an improved construction and arrangement of teeth and means whereby the same may be quickly and easily adjusted to change the cultivator for right or left hand work or to change the same into a rake, said teeth also being adapted to be readily shifted to convert the device into a double plow or cultivator.

Another object is to provide a cultivator of this character which will be simple, strong, durable and inexpensive in construction, efficient and reliable in operation and well adapted to the purpose for which it is designed.

With these and other objects in view the invention consists of certain novel features of construction and the combination and arrangement of parts as will be more fully described and claimed.

In the accompanying drawings; Figure 1 is a side view of a cultivator constructed in accordance with my invention; Fig. 2 is a top plan view thereof; Fig. 3 is a bottom plan view of the forward end of the cultivator, showing more clearly the manner in which the teeth of the cultivator are adjustably secured; and Fig. 4 is vertical cross sectional view on the line 4—4 of Fig. 1.

My improved cultivator comprises a frame consisting of a central longitudinally disposed bar or beam 1 to the upper and lower sides of which at its rear end are bolted upper and lower teeth supporting bars 2 and 3 the ends of which are secured together by bolts 4 as shown.

To the forward end of the beam 1 is pivoted a circular tooth adjusting disk 5 in which are formed series of radially disposed bolt holes 6, 7 and 8 and in which near its forward edge is formed a series of bolt holes 9. The series of bolt holes 6 and 7 are arranged in line with each other and with the center or pivotal connection of the disk with the beam 1 and in said holes are arranged bolts 10 by means of which the forward ends of the tooth bars 11 are pivotally connected to the disk 5. The bars 11 near their rear ends are slidably engaged between the bars 2 and 3 of the frame and at their rear ends are bent or curved downwardly and shaped to form teeth 12. By thus pivotally connecting the forward ends of the tooth bars with the disk 5 it will be seen that by turning said disk in one direction or the other on the pivot bolt 13 which pivotally connects the same with the beam 1, the tooth bars and teeth on opposite sides of the beam will be adjusted to form either a right or left hand cultivator. When the disk 5 has thus been turned to adjust the teeth to the desired positions the disk is locked and the teeth thereby fastened in this position by a fastening bolt 14 which is engaged with one of the bolt holes 9 in the forward edge of the disk and in the forward end of the beam which is provided with a bolt hole to receive said bolt. The bolt 14 when thus arranged also serves as a clevis bolt for attaching a clevis or other draft device 15 to the forward end of the beam.

The cultivator is provided with suitable handles 16 the forward ends of which are brought together and secured by the beam 1 and disk 5 by the pivot bolt 13. The handles 16 are supported and secured to the cross bars 2 and 3 of the frame by supporting and bracing bars 17, the upper ends of which are bolted to the handles and the lower ends of which are bent at right angles to form attaching lugs 18, said lugs having therein bolt holes with which are engaged the bolts 4 in the outer ends of the bars 2 and 3.

By constructing my cultivator as herein shown and described it will be seen that in order to change the same to form either a right or left hand cultivator it is simply necessary to remove the fastening bolt 14 in the outer end of the beam 1 and adjacent portion of the disk 5 and to turn said disk on the pivot bolt 13 in the desired direction and to a sufficient extent to bring either of the other bolt holes 9 in the outer edge of the disk into register with the bolt hole in the outer end of the beam whereupon the fastening bolt 14 is again engaged with said bolt holes, thus fastening the disk and holding the teeth in their adjusted positions. In order to change the cultivator into a rake or harrow the disk 5 is adjusted until the central hole 9 in the outer edge of the disk is brought into alinement with the hole in the outer end of the beam and to secure the disk in this position by the fastening bolt 14, thus holding the teeth in a straight line, in which position the cultivator may be employed as a rake or harrow. When the teeth are in the position last described the two inner teeth may be disengaged from the inner bolt holes 6 and 7 and moved ahead and connected in bolt holes 19 arranged in the disk slightly in advance of the inner bolt holes 6 and 7 thus forming a double plow for covering purposes. When the disk is in the position just described the teeth on one side of the beam may be disconnected from the bolt holes 7 in the disk and connected with the series of bolt holes 8, thus forming a double side plow or cultivator by means of which both sides of a row of plants may be simultaneously cultivated.

By constructing a cultivator in accordance with my invention it will be seen that the teeth thereof may be quickly and easily adjusted or changed to different positions thus enabling the cultivator to be employed for a number of different purposes so that the one implement will take the place of a number of implements usually required for performing the same operations.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is;

1. In a cultivator, a supporting frame comprising a beam, a cross bar secured to the rear end of said beam, a tooth adjusting disk pivotally secured to the forward end of said beam and having a series of radially disposed bolt holes, a plurality of tooth bars slidably engaged with said cross bar, teeth on said tooth bars, bolts in the radial bolt holes to pivotally connect the forward ends of said tooth bars therewith, and means to fasten said disk for holding the tooth bars in adjusted position.

2. In a cultivator of the character described, a supporting frame comprising a beam, cross bars secured to the rear end of said beam, a tooth adjusting disk pivotally secured to the forward end of said beam, said disk having therein series of radially disposed bolt holes, and a series of fastening bolt holes, a plurality of tooth bars slidably engaged with said cross bars, teeth arranged on the rear ends of said tooth bars, bolts arranged in the radial bolt holes of said disk to pivotally connect the forward ends of the tooth bars therewith, a fastening bolt arranged in the forward end of said beam and adapted to be engaged with one of the fastening bolt holes in said disk whereby the latter is locked to hold the teeth in position when adjusted by the turning of said disk.

3. In a cultivator of the character described, a supporting frame comprising a beam, cross bars secured to the rear end of said beam, a tooth adjusting disk pivotally secured to the forward end of said beam, said disk having therein series of radially disposed bolt holes, and a series of fastening bolt holes, a plurality of tooth bars slidably engaged with said cross bars, teeth arranged on the rear ends of said tooth bars, bolts arranged in the radial bolt holes of said disk to pivotally connect the forward ends of the tooth bars therewith, a fastening bolt arranged in the forward end of said beam and adapted to be engaged with one of the fastening bolt holes in said disk whereby the latter is locked to hold the teeth in position when adjusted by the turning of said disk, a clevis secured to said beam by the fastening bolt, handles connected at their forward ends to the beam, and brace bars connected to said cross bars whereby the handles are braced and supported in operative position.

In testimony whereof I have hereunto set my hand in presence of two subscribing witnesses.

J. K. WEDGWORTH.

Witnesses:
J. M. McElroy,
A. K. Tate.